United States Patent
Yeh

(10) Patent No.: US 8,423,707 B2
(45) Date of Patent: Apr. 16, 2013

(54) DATA ACCESS METHOD FOR FLASH MEMORY AND STORAGE SYSTEM AND CONTROLLER USING THE SAME

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 967 days.

(21) Appl. No.: 12/490,092

(22) Filed: Jun. 23, 2009

(65) Prior Publication Data

US 2010/0274949 A1    Oct. 28, 2010

(30) Foreign Application Priority Data

Apr. 23, 2009   (TW) ................................ 98113536 A

(51) Int. Cl.
*G06F 12/00*    (2006.01)
*G06F 13/00*    (2006.01)

(52) U.S. Cl.
USPC ............................. 711/103; 711/100; 711/154

(58) Field of Classification Search .................. 711/103, 711/100, 154
See application file for complete search history.

(56) References Cited

U.S. PATENT DOCUMENTS

2002/0051394 A1 *   5/2002   Tobita et al. .................. 365/221
2009/0037651 A1 *   2/2009   Gorobets ...................... 711/103

* cited by examiner

*Primary Examiner* — Tuan V. Thai
(74) *Attorney, Agent, or Firm* — J.C. Patents

(57) ABSTRACT

A data access method for accessing a flash memory storage system, a storage system and a controller using the same are provided. A flash memory has a plurality of physical blocks, which are grouped into a system area, a data area, and a spare area. One or more variable tables are established to record transient information of each set of mother-child blocks of the data area and the spare area. The number of the variable table could be adjusted adaptively according to time required for writing the variable table into the system area, such that an overall data access efficiency of the flash memory storage system is enhanced.

22 Claims, 6 Drawing Sheets

DATA ACCESS METHOD FOR FLASH MEMORY AND STORAGE SYSTEM AND CONTROLLER USING THE SAME

CROSS-REFERENCE TO RELATED APPLICATION

This application claims the priority benefit of Taiwan application serial no. 98113536, filed on Apr. 23, 2009. The entirety of the above-mentioned patent application is hereby incorporated by reference herein and made a part of this specification.

BACKGROUND

1. Technology field

The present invention is related to a data access method, and more particularly, to a data access method for accessing a flash memory, and a storage system, and a controller using the same.

2. Description of Related Art

Digital cameras, mobile phones, and MP3 players have grown rapidly in recent years, which result in a rapid increase in demand of storage media by consumers. Flash memory is very suitable to be embedded in every kind of portable multimedia device described previously due to its characteristics such as data non-volatility, low power consumption, small volume, and non-mechanical structure. Besides, storage devices using NAND flash memory or NOR flash memory as storage media (e.g., a memory card) have been widely applied in storing personal important data due to small volume, large storage capacity, and convenience of being carried around, whereby flash memory industry becomes quite popular in electronics industry in recent years.

Generally speaking, flash memory of the storage system is divided into a plurality of physical blocks, and the physical blocks are grouped into a data area and a spare area. The physical blocks grouped as the data area store valid data written by the write command, and the physical blocks in the spare area are used to substitute the physical blocks in the data area when the write command is executed. More specifically, when the storage system receives the write command from a host and is about to write data into the physical blocks to be updated in the data area, the storage system selects one of the physical blocks from the spare area, and copies valid old data of the physical block to be updated in the data area, and writes the copied valid old data together with new data to be written into the physical block selected from the spare area. Then, the storage system links the physical block containing the new data to the data area, and erases the physical block to be updated and links the erased physical block to the spare area.

In order to enable the host to access the physical blocks which store the data in an alternation manner, the storage system provides the host with the logical blocks to access data. More specifically, the storage system maintains a logical block-physical block mapping table in which a mapping relationship between the logical blocks and the physical blocks in the data area is recorded. Meanwhile, when the write command is executed by the storage system such that the physical blocks of the data area are substituted with the physical blocks of the spare area, the storage system updates the logical block-physical block mapping table for correctly accessing the data later on.

In addition, in order to correctly utilize the physical blocks of the spare area, the storage system records transient information of each set of mother-child blocks between the spare area and the data area in one variable table.

When the transient information of any one set of mother-child blocks between the spare area and the data area is changed, the above-described variable table is required to be updated. However, in a case where memory volume of the storage system becomes larger such that a larger variable table is required, time required for updating the variable table becomes too long, whereby performance of the storage system becomes low.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the prevent invention provides a data access method, which may limit time required for updating a variable table below an upper limit processing time, thereby enhancing an overall access efficiency of a storage system.

Besides, the present invention provides a controller, which utilizes the above-described data access method to access the flash memory for controlling the time required for updating the variable table and enhancing the overall access efficiency of the storage system.

Moreover, the present invention provides a storage system, which utilizes the above-described data access method to access the flash memory for controlling the time required for updating the variable table and enhancing the overall access efficiency of the storage system.

An exemplary embodiment of the present invention provides a data access method including providing a flash memory and allocating a plurality of logical blocks, wherein the flash memory has a plurality of physical blocks, and each of the logical blocks maps to at least one physical block. The data access method also includes allocating a variable table for recording transient information about mother-child blocks corresponding to the logical blocks. The data access method also includes determining whether time required for writing the variable table in the flash memory is more than an upper limit processing time, and grouping the logical blocks into a first logical block group and a second logical block group, and dividing the above-described variable table into at least a first sub-variable-table and a second sub-variable-table when the time required for writing the variable table in the flash memory is determined to be more than the upper limit processing time. In addition, the data access method also includes accessing data in the physical blocks mapping to the logical blocks of the first logical block group according to the first sub-variable table, and accessing data in the physical blocks mapping to the logical blocks of the second logical block group according to the second sub-variable table.

An exemplary embodiment of the present invention provides a data access method including providing a flash memory and allocating a plurality of logical blocks, wherein the flash memory has a plurality of physical blocks, and each of the logical blocks maps to at least one physical block. The data access method also includes at least grouping the logical blocks into a first logical block group and a second logical block group, configuring a first sub-variable-table corresponding to the first logical block group, and configuring a second sub-variable-table corresponding to the second logical block group, wherein the first sub-variable-table at least records transient information about the mother-child blocks for the first logical block group, and the second sub-variabletable at least records transient information about the mother-child blocks for the second logical block group. In addition, the data access method also includes accessing data in the physical blocks mapping to the logical blocks of the first logical block group according to the first sub-variable table, and accessing data in the physical blocks mapping to the logical blocks of the second logical block group according to the second sub-variable table.

An exemplary embodiment of the present invention provides a controller for controlling a flash memory, wherein the flash memory has a plurality of physical blocks, and the controller includes a microprocessor unit, a flash memory interface, and a memory management unit. The flash memory interface is coupled between the microprocessor unit and the flash memory. The memory management unit is coupled to the microprocessor unit for configuring a plurality of logical blocks, wherein each of the logical blocks maps to at least one physical block. The memory management unit at least groups the logical blocks into a first logical block group and a second logical block group, configures the first sub-variable-table corresponding to the first logical block group, configures the second sub-variable-table corresponding to the second logical block group, accesses the physical blocks mapping to the logical blocks of the first logical block group according to the first sub-variable-table, and accesses the physical blocks mapping to the logical blocks of the second logical block group according to the second sub-variable-table, wherein the first sub-variable-table at least records transient information about the mother-child blocks for the logical blocks of the first logical block group, and the second sub-variable-table at least records transient information about the mother-child blocks for the logical blocks of the second logical block group.

An exemplary embodiment of the present invention provides a storage system, including a connector, a flash memory, and a controller, wherein the flash memory has a plurality of physical blocks. The controller is coupled to the connector and the flash memory for configuring a plurality of logical blocks, wherein each of the logical blocks maps to at least one physical block. In addition, the controller at least groups the logical blocks into a first logical block group and a second logical block group, configures a first sub-variable table corresponding to the first logical block group, configures a second sub-variable table corresponding to the second logical block group, accesses the physical blocks mapping to the logical blocks of the first logical block group according to the first sub-variable-table, and accesses the physical blocks mapping to the logical blocks of the second logical block group according to the second sub-variable-table, wherein the first sub-variable-table at least records transient information about the mother-child blocks for the logical blocks of the first logical block group, and the second sub-variable table at least records transient information about the mother-child blocks for the logical blocks of the second logical block group.

The present invention utilizes one or more variable tables to manage the transient information of the mother-child blocks of the data area and the spare area. The number of the above-described variable tables is adjusted adaptively according to the time required for writing the above-described variable tables into the flash memory, so as to enhance the overall access efficiency of the storage system.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
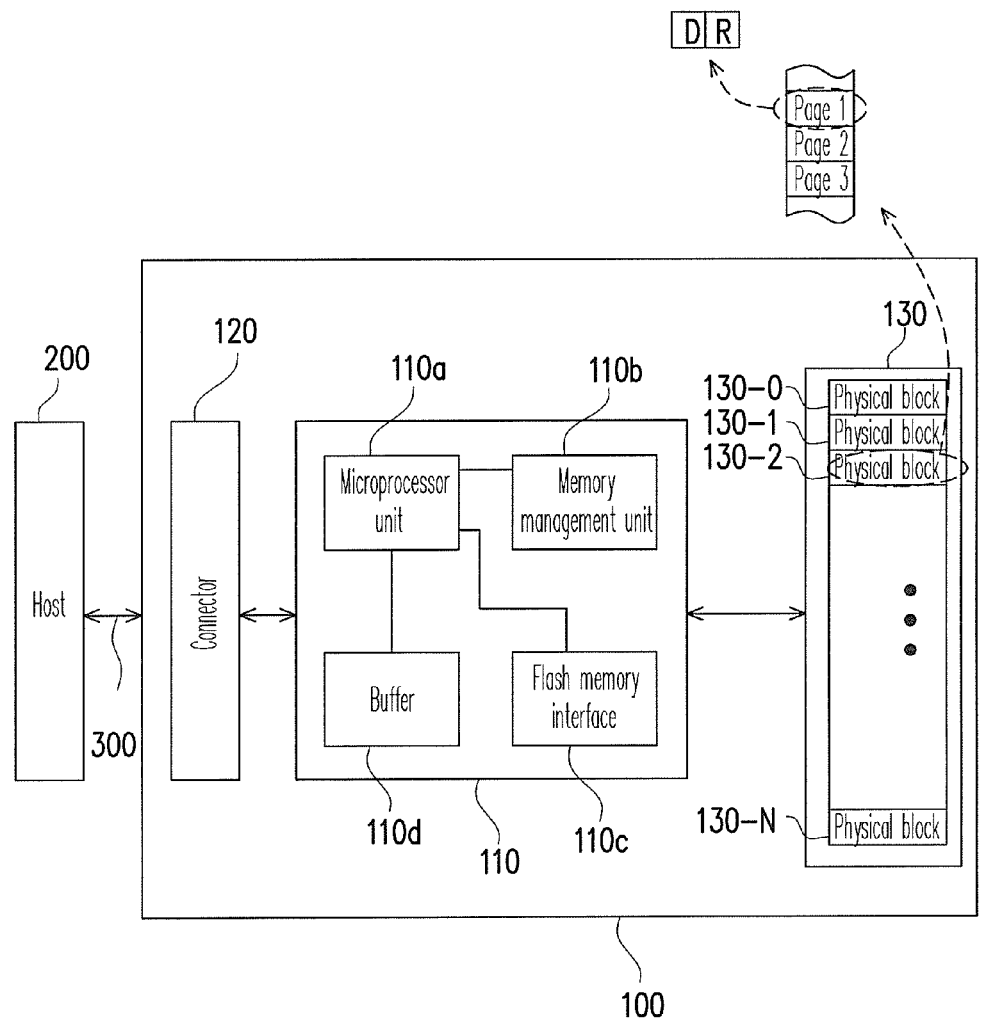
FIG. 1 is a schematic block diagram illustrating a storage system according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

FIG. 1 is a schematic block diagram illustrating a storage system according to an exemplary embodiment of the present invention. Referring to FIG. 1, the storage system 100 includes a controller 110, a connector 120, and a flash memory 130.

Usually, the storage system 100 is utilized together with a host 200, such that the host 200 may write data into the storage system 100 or read the data from the storage system 100. In the present exemplary embodiment, the storage system 100 is a solid state drive (SSD). However, it should be understood that, in another exemplary embodiment of the present invention, the storage system 100 may also be a memory card or a flash drive.

The controller 110 executes a plurality of commands which are implemented in a hardware form or in a firmware form, so as to coordinate with the connector 120 and the flash memory 130 for writing, reading and erasing data in the flash memory 130. The controller 110 includes a microprocessor unit 110a, a memory management unit 110b, a flash memory interface 110c, and a buffer 110d.

The microprocessor unit 110a collaborates with the memory management unit 110b, the flash memory interface 110c and the buffer 110d for performing the operations of writing, reading or erasing data of the storage system 100.

The memory management unit 110b is coupled to the microprocessor unit 110a. The memory management unit 110b is configured to perform block management mechanisms, data writing mechanisms, wear leveling mechanisms, and maintain the variable tables and the logical block-physical block mapping tables according to the present exemplary embodiment. In the present exemplary embodiment, the memory management unit 110b and the microprocessor unit 110a are two different units of the controller 110, but in another exemplary embodiment of the present invention, the memory management unit 110b and the microprocessor unit 110a are integrated in the same unit of the controller 110.

In the present exemplary embodiment, the memory management unit 110b is implemented in a firmware form in the controller 110. For example, mechanical commands may be written by a program language and stored in a program memory (e.g., a read only memory (ROM)) and the program memory is further embedded in the flash memory controller 110 for implementing the memory management unit 110b, wherein when the storage system 100 is activated, a plurality of machine commands of the memory management unit 110b are loaded to the buffer 110d and executed by the microprocessor unit 110a to perform block management mechanisms, data writing mechanisms, wear leveling mechanisms, and maintain the variable tables and the logical block-physical block mapping tables according to the present exemplary embodiment.

In another exemplary embodiment of the present invention, the machine commands of the memory management unit 110b may also be stored in a specific area (e.g., a system area 202 as described below) of the flash memory 130 in a software form, and when the storage system 100 is operated, a plurality of machine commands of the memory management unit 110b may be loaded into the buffer 110d and executed by the microprocessor unit 110a. Moreover, in another exemplary embodiment of the present invention, the memory management unit 110b may also be implemented in the controller 110 in a hardware form.

The flash memory interface 110c is coupled between the microprocessor unit 110a and the flash memory 130 to access the flash memory 130. The data to be written into the flash memory 130 from the host 200 is transformed to a format acceptable by the flash memory 130 through the flash memory interface 110c.

The buffer 110d is coupled to the microprocessor unit 110a for temporarily storing system data (such as the logical block-physical block mapping table) or the data read or written by the host 200. In the present exemplary embodiment, the buffer 110d is a static random access memory (SRAM). However, it should be understood that the present invention is not limited thereto. A Dynamic Random Access Memory (DRAM), a Magnetoresistive Random Access Memory (MRAM), a Phase Change Random Access Memory (PRAM), or other suitable types of memories may also be adopted in the present invention.

Besides, although not illustrated in the present exemplary embodiment, the controller 110 may further include other general function modules for controlling the flash memory, such as an error correction unit, and a power management unit.

The connector 120 is used to connect with the host 200 via a bus 300. In the present exemplary embodiment, the connector 120 is a Serial Advanced Technology Attachment (SATA) interface. However, it should be understood that the present invention is not limited thereto, and the connector 120 may also be a Universal Serial Bus (USB) interface, an Institute of Electrical and Electronics Engineering (IEEE) 1394 interface, a Peripheral Component Interconnect (PCI) Express interface, an Memory Stick (MS) interface, an Multimedia Memory Card (MMC) interface, a Secure Disk (SD) interface, a Compact Flash (CF) interface, an Integrated Drive Electronics (IDE) interface, or other suitable types of interfaces for data transmission.

The flash memory 130 is coupled to the controller 110 for storing data. The flash memory 130 is partitioned into a plurality of physical blocks 130-0~130-N. Generally, one physical block in a flash memory is a smallest unit for erasing. That is to say, each of the physical blocks has a minimum number of memory cells to be erased altogether. Each of the physical blocks is usually divided into a plurality of pages. Generally, one page is a smallest unit for programming. However, it needs to be pointed out that, in some different kinds of flash memory designs, the smallest unit for programming may also be a sector. In other words, one page includes a plurality of sectors, and one sector is the smallest unit for programming. In other words, the page is the smallest unit for writing the data or reading the data. Each of the pages usually includes a user data area D and a redundancy area R. The user data area D stores user data and the redundant area R stores system data (e.g., an error correcting code (ECC)).

In order to correspond to the size of one sector in a disk driver, generally, the user data area D is 512 bytes and the redundant area R is 16 bytes. That is to say, one page is one sector in the present exemplary embodiment. However, one page also be formed by a plurality of sectors, such as one page including four sectors.

Generally, one physical block may include any number of pages, such as 64 pages, 128 pages, 256 pages, and so forth. And, physical blocks 130-0~130-N can also be grouped into a plurality of zones. By managing the physical blocks 130-0 to 130-N in units of zones, the parallelism of operations is increased and the management of these physical blocks is simplified.

Figure 2A:
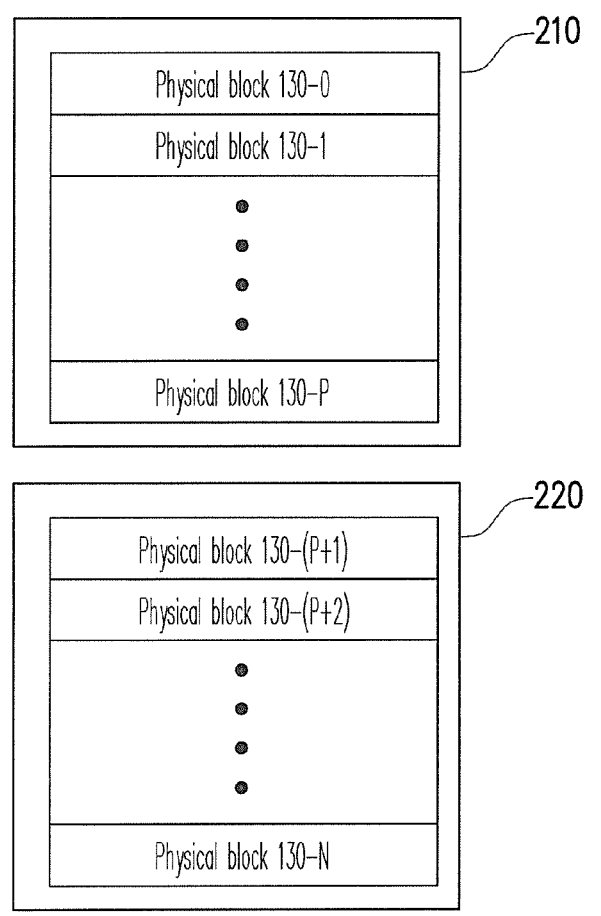
FIGS. 2A-2C are schematic diagrams illustrating operations of a flash memory according to an exemplary embodiment of the present invention.
Figure 2B:
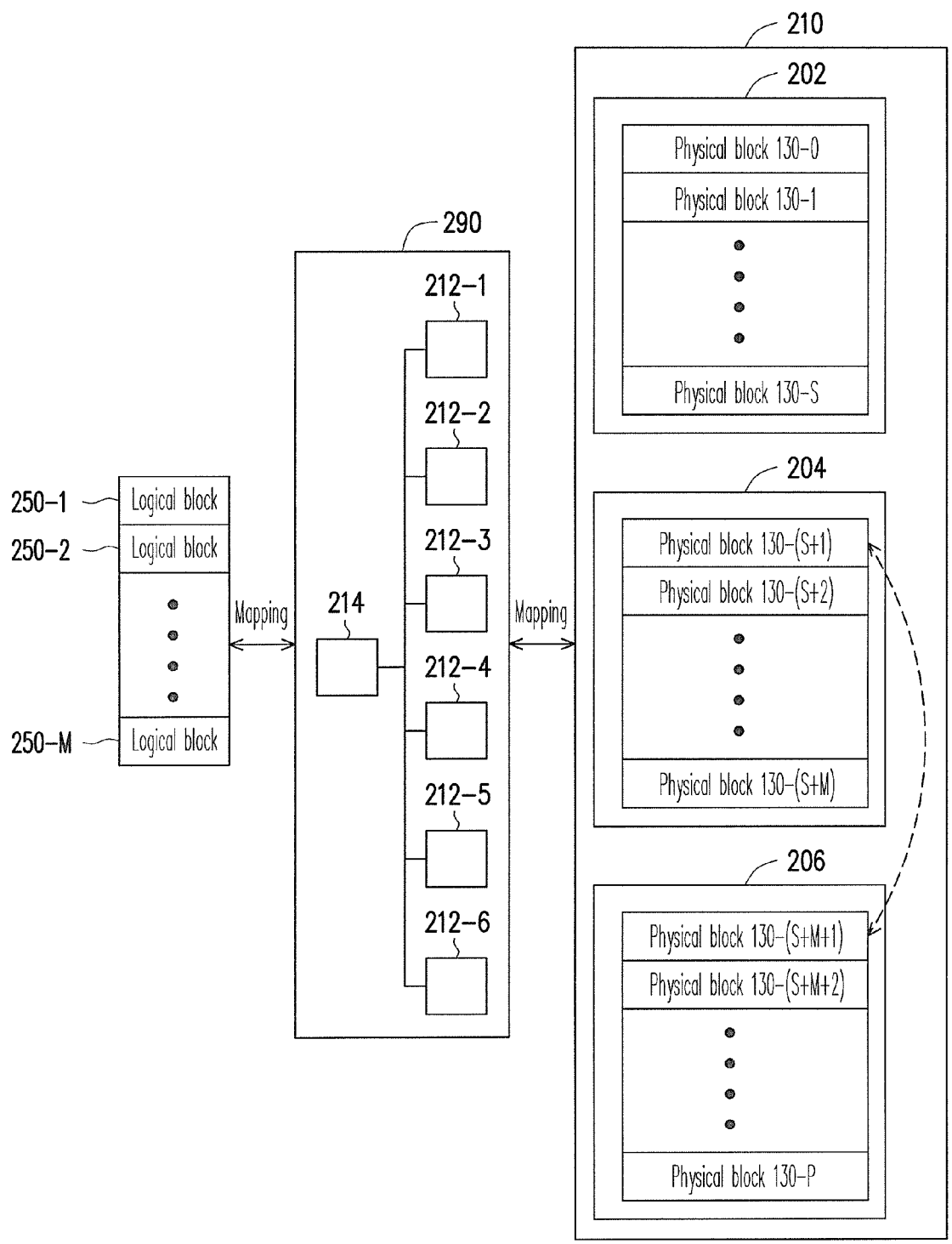
Figure 2C:
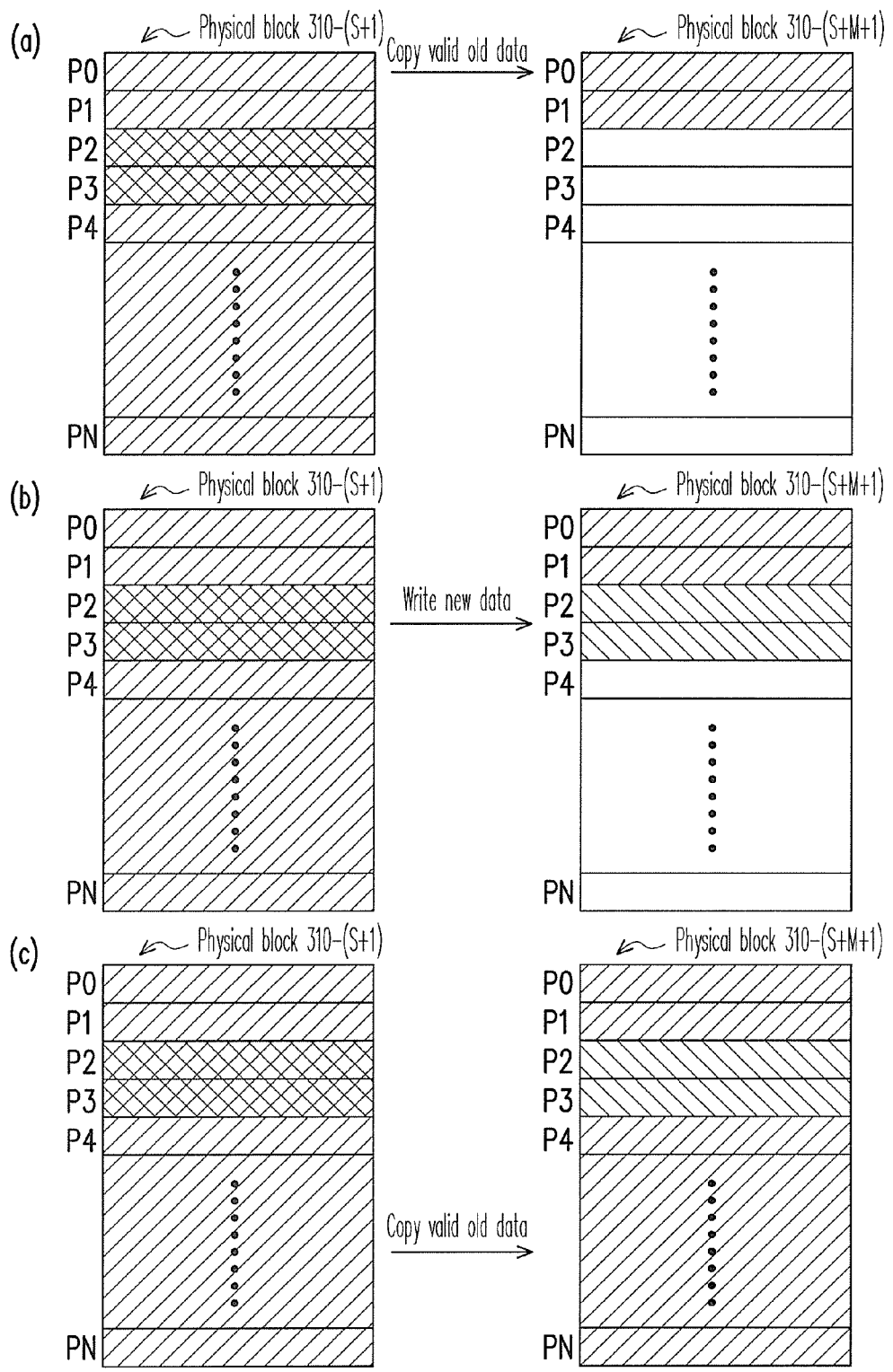

FIGS. 2A-2C are schematic diagrams illustrating operations of a flash memory according to an exemplary embodiment of the present invention.

It should be understood that terms, such as "select", "move", "exchange", "replace", "alternate", "group", and so forth, are logical concepts which describe operations on the physical blocks of the flash memory 130. That is, the physical blocks of the flash memory are logically operated, but actual positions of the physical blocks are not changed. It is to be noted that, the operations described below is accomplished by the controller 110.

Referring to FIG. 2A, the memory management unit 110b logically groups the physical blocks 130-0~130-N of the flash memory 130 into a storage area 210 and a replacement area 220.

The physical blocks 130-0~130-P in the storage area 210 are the physical blocks which are normally used in the storage system 100. That is, the memory management unit 110b writes data into the physical blocks belonging to the storage area 210.

The physical blocks 130-(P+1)~130-(N) in the replacement area 220 are replaced physical blocks. For example, when the flash memory 130 is manufactured by a factory, 4% of the physical blocks thereof are reserved for replacement.

That is, when any of the physical blocks in the storage area 210 is damaged, the physical blocks reserved in the replacement area 220 are used to replace the damaged physical blocks (i.e. bad blocks). Therefore, if the replacement area 220 still has available physical blocks therein, the memory management unit 110b selects the available physical blocks from the replacement area 220 to replace the damaged physical blocks when a situation of the damaged physical blocks occurs. If the replacement area 220 no longer has any of the available physical blocks and when the situation of the damaged physical blocks occurs, the flash memory storage device 100 is announced to be invalid.

Referring to FIG. 2B, the flash memory controller 110 logically groups the physical blocks of the storage area 210 into a system area 202, a data area 204, and a spare area 206.

The system area 202 includes physical blocks 130-(0)~130-(S), the data area 204 includes physical blocks 130-(S+1)~130-(S+M), and the spare area 206 includes physical blocks 130-(S+M+1)~130-(P). In the present exemplary embodiment, the aforementioned S, M, and P are positive integers and smaller than N which represent a number of physical blocks disposed in each area, and may be varied based on a capacity of the flash memory module used by the manufacturer of the flash memory storage device.

The physical blocks logically belonging to the system area 202 records the system data, which includes information related to the manufacturer and a model of the flash memory chip, the number of the zones in each flash memory module, the number of physical blocks in each zone, the number of pages in each physical block, and so forth.

The physical blocks logically belonging to the data area 204 stores the user data and the physical blocks are generally corresponding to the logic blocks accessed by the host 200. That is, the physical blocks of the data area 204 are blocks which store valid data.

The physical blocks logically belonging to the spare area 206 are used to substitute the physical blocks of the data area 204. Therefore, the physical blocks of the spare area 206 are blank or available units, and it also means that these physical blocks have no data recorded thereon or have no data marked as invalid. More specifically, since each address in the flash memory 130 just is programmed once before being erased, an erasure has to be performed if it is required to re-write the data into the data locations which have been written previously. However, as mentioned previously, a writing unit of the flash memory 130 is a page, which is smaller than an erasure unit based on the physical blocks. Therefore, if it is required to perform the erasure of the physical blocks, the erasure is performed after data stored in valid page addresses of the physical blocks to be erased has been copied to other physical blocks. Accordingly, in the present exemplary embodiment, the physical blocks of the data area 204 and the spare area 206 are alternated to store data written into the storage system 100 by the host 200.

As mentioned previously, the physical blocks of the flash memory 130 are alternated to be provided to the host 200 for storing data. Therefore, in the present exemplary embodiment, the logical blocks 250-1~250-M are provided to the host 200 for accessing data, and the memory management unit 110b maps the logical blocks 250-1~250-M to the physical blocks of the data area 204 and the spare area 206 through a conversion layer 290.

The conversion layer 290 includes a plurality of logical block-physical block mapping tables (e.g., logical block-physical block mapping tables 212-1~212-6). The memory management unit 110b maintains the logical block-physical block mapping tables 212-1~212-6 to sequentially record the physical blocks mapped to each of the logical blocks 250-1~250-M for accessing data. That is, the logical block-physical block mapping tables 212-1~212-6 respectively record a mapping relationship between a portion of the logical blocks and the mapped physical blocks according to a sequence of the logical blocks 250-1~250-M. It is should be understood that, although the conversion layer 290 includes six logical block-physical block mapping tables to record the physical blocks mapping to each of the logical blocks in the present exemplary embodiment, the present invention is not limited thereto, and in another exemplary embodiment of the present invention, the conversion layer 290 may include more or less of the logical block-physical block mapping tables to record the physical blocks mapping to all the logical blocks in a more distributed manner or in a more centralized manner.

For example, referring to FIG. 2B and FIG. 2C, when the host 200 writes data into the logic block 250-1, the flash memory controller 110 refers to the logical block-physical block mapping table to determine that the logic block 250-1 is currently mapping to a physical block 130-(S+1) which logically belongs to the data area 204. Thus, the memory management unit 110b updates the data in the physical block 130-(S+1), and meanwhile, the flash memory controller 110 selects the physical block 130-(S+M+1) from the spare area 206 to substitute the physical block 130-(S+1) of the data area 204. However, the memory management unit 110b does not instantly move all the valid data in the physical block 130-(S+1) into the physical block 130-(S+M+1) and erase the physical block 130-(S+1) when the memory management unit 110b writes new data into the physical block 130-(S+M+1). To be more specific, the flash memory controller 110 copies the valid data to be written (i.e. pages P0 and P1) from the physical block 130-(S+1) to the physical block 130-(S+M+1) (i.e., as illustrated in FIG. 2C(a)) and then writes the new data (i.e. pages P2 and P3 of the physical block 130-(S+M+1)) into the physical block 130-(S+M+1) (i.e., as illustrated in FIG. 2C(b)). At this time, the flash memory controller 110 accomplishes a writing action. Since the valid data in the physical block 130-(S+1) may become invalid in the next operation (for example, the write command), instantly moving all the valid data in the physical block 130-(S+1) to the substitute physical block 130-(S+M+1) may be unnecessary. In this case, an integration of the contents of the physical block 130-(S+1) and the physical block 130-(S+M+1) is a complete content of the mapping logic block 250-1. The number of such a transient relationship of mother-child blocks (i.e. the physical block 310-(S+1) and the physical block 310-(S+M+1)) is determined based on size of the buffer 110d in the flash memory controller 110. The operation of temporarily maintaining this transient relationship is generally referred to as "opening" mother-child blocks.

Thereafter, when actually integrating the contents of the physical block 130-(S+1) and the physical block 130-(S+M+1), the flash memory controller 110 integrates the physical unit 130-(S+1) with the physical unit 130-(S+M+1) into one physical unit, thereby enhances an efficiency of use of the blocks. Such an integration action is also referred to as "closing" mother-child blocks. For example, as illustrated in FIG. 2C(c), when closing the mother-child blocks, the flash memory controller 110 copies the remaining of the valid data (i.e. pages P4~PN) of the physical block 130-(S+1) to the substitute physical block 130-(S+M+1), and then erases the physical block 130-(S+1) and links the physical block 130-(S+1) to the spare area 206. Meanwhile, the flash memory controller 110 links the physical block 130-(S+M+1) to the data area 204 and changes the mapping of the logic block 250-1 to the physical block 130-(S+M+1) in the logical block-physical block mapping table, thereby, the operation of closing the mother-child blocks is completed.

It is to be noted that the conversion layer 290 further includes a variable table 214, and the variable table 214 stores transient information of one set or a plurality of sets of the mother-child blocks. To be more specific, the variable table 214 corresponds to the logical block-physical block mapping tables 212-1~212-6 for storing correspondence relationship of the logical blocks recorded in the logical block-physical block mapping tables 212-1~212-6 when the mother-child blocks are opened, wherein the transient information of each set of the mother-child blocks records addresses of the logical blocks mapping to the child physical block of the set of the mother-child blocks. The number of the sets of the mother-child blocks stored in the variable table 214 is determined according to size of the buffer 110d in the flash memory controller 110, for example, in an embodiment of the present invention, the variable table 214 normally stores the transient information of eight sets of the mother-child blocks.

Besides, the variable table 214 is stored in the physical blocks of the system area 202. And, before writing the variable table 214 into the system area 202, the memory management unit 110b determines whether the time required for writing the variable table 214 into the flash memory 130 is going to be more than an upper limit processing time. Wherein, the above-described upper limit processing time is determined according to related data transmission time and programming time between the flash memory controller 10 and the flash memory 130, but it should be understood that the present invention is not limited thereto. Take an example of one page has a capacity of four kilo bytes (KB), assuming when one of the pages in the flash memory 130 is to be programmed, a time required for the flash memory controller 110 transmitting data to the flash memory 130 is 130 microseconds, and a time required for programming the page is 200 microsecond, then the upper limit processing time is set as 330 microseconds (i.e., 130 microseconds plus by 200 microseconds).

When the memory management unit 110b determines the time required for writing the variable table 214 into the flash memory 130 is more than the above-described upper limit processing time, the memory management unit 110b groups the logical block 250-1~250-M, and divide the variable table 214 into a plurality of the sub-variable-tables according to the grouping, wherein time required for writing the sub-variable-tables in the flash memory 130 is less than the above-described upper limit processing time.

Figure 3:
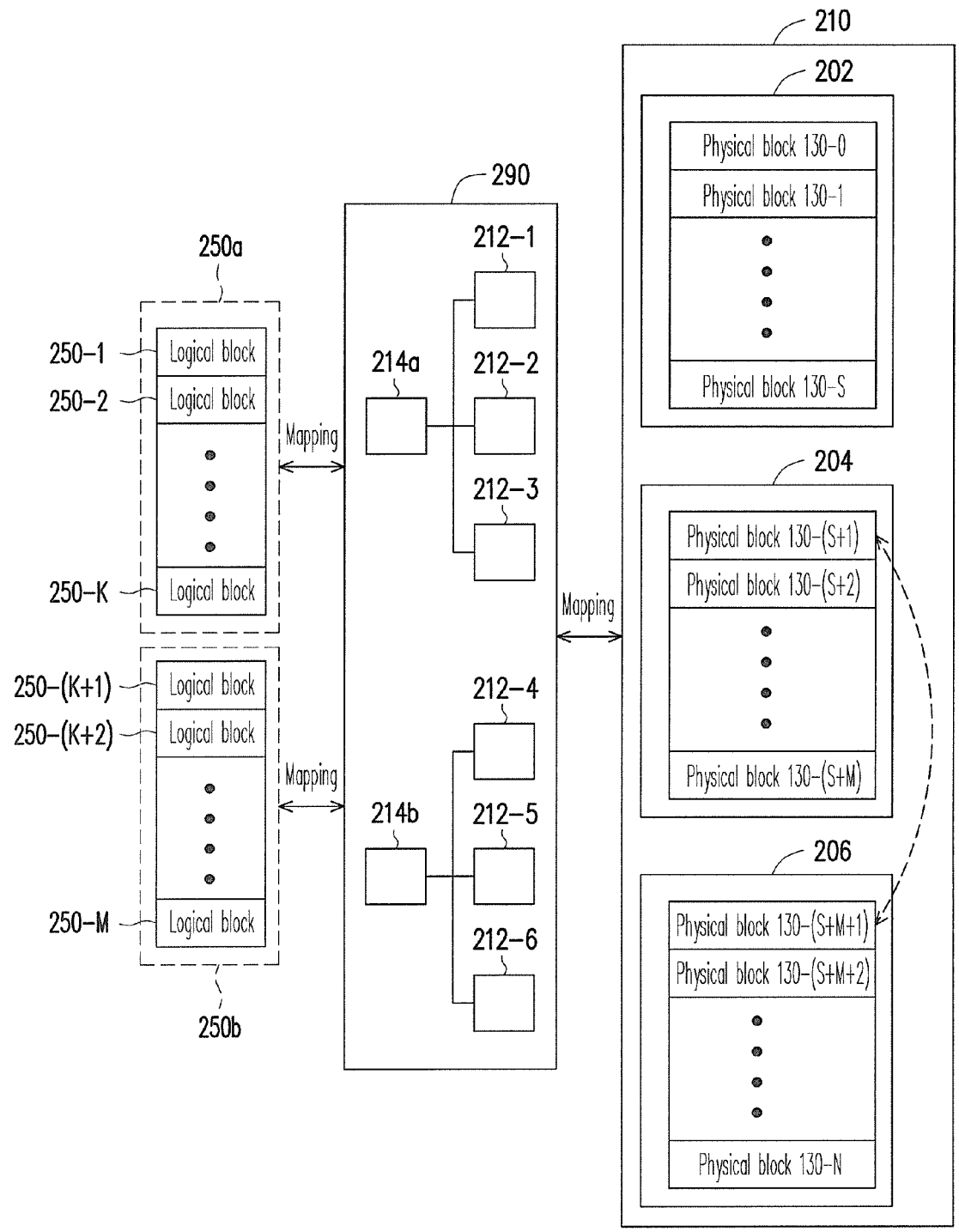
FIG. 3 is a schematic diagram illustrating grouped logical blocks and divided variable tables according to an exemplary embodiment of the present invention.

FIG. 3 is a schematic diagram illustrating grouped logical blocks according to an exemplary embodiment of the present invention.

Referring to FIG. 3, the logical block 250-1~250-M are grouped into a first logical block group 250a and a second logical block group 250b, and the variable table 214 is divided to a first sub-variable table 214a corresponded to the first logical block group 250a and to a second sub-variable table 214b corresponded to the second logical block group 250b.

In the present exemplary embodiment, the memory management unit 110b groups a first half portion of the logical blocks (e.g., the logical block 250-1~the logical block 250-K) into the first logical block group 250a and groups a second half portion of the logical blocks (e.g., the logical block 250-(K+1)~the logical block 250-M) into the second logical block group 250b according to a continuous sequence of the logical block 250-1~250-M. It should be understood that the present invention is not limited thereto, in another exemplary embodiment of the present invention, the memory management unit 110b may also group the logical blocks 250-1~250-M in an odd-even way (e.g., the logical blocks numbered with odd numbers are grouped into one group and the logical blocks numbered with even numbers are grouped into another group) or in a random way. In addition, in another embodiment of the present invention, the memory management unit 110b establishes a logical block group table in order to manage the grouping of the logical block 250-1~250-M.

It is to be noted that the first sub-variable table 214a and the second sub-variable table 214b are respectively corresponding to a portion of the logical blocks, so the first sub-variable table 214a and the second sub-variable table 214b respectively just need to record the transient information of the portion of the logical blocks opening the mother-child blocks and the information of the physical blocks of the corresponding spare area. For example, if there are at most eight sets of mother-child blocks and there are 20 physical blocks allocated in the spare area 206, the memory management unit 110b allocates the logical blocks of the first logical block group 250a and the logical blocks of the second logical block group 250b to respectively open at most four sets of mother-child blocks. Besides, the memory management unit 110b respectively utilizes ten corresponding physical blocks in the spare area 206 to execute the opening mother-child blocks on the logical blocks of the first logical block group and the second logical block group.

In particular, the original variable table 214 is required to record the transient information for the eight sets of the mother-child blocks and the information for 20 physical blocks in the spare area 206, and the first sub-variable table 214a and the second sub-variable table 214b are just required to respectively record the transient information for the four sets of the mother-child blocks and the information for 10 physical blocks. Therefore, the size of the first sub-variable table 214a and the size of the second sub-variable table 214b are less than the size of the variable table 214, respectively.

In another exemplary embodiment of the present invention, the maximum number of the mother-child blocks opened by each of the logical block groups can be different. For example, when there are at most eight sets of the mother-child blocks which may be opened, the memory management unit 110b allocates the logical blocks of the first logical block group 250a to open at most six sets of the mother-child blocks, and allocate the logical blocks of the second logical block group 250b to open at most two sets of the mother-child blocks.

It is to be noted that when the variable table 214 is divided into the first sub-variable table 214a and the second sub-variable table 214b, since the memory management unit 110b respectively records the transient information of the portion of the logical blocks opening the mother-child blocks in the first sub-variable table 214a and the second sub-variable table 214b, the first sub-variable table 214a and the second sub-variable table 214b respectively just correspond to a portion of the logical block-physical block mapping tables. For example, in the present exemplary embodiment, the first sub-variable table 214a corresponds to the logical block-physical block mapping tables 212-1, 212-2, and 212-3, and the second sub-variable table 214b corresponds to the logical block-physical block mapping tables 212-4, 212-5, and 212-6.

In view of the above, when the host 200 issues an access command to the storage system 100 for accessing the data from the logical blocks of the flash memory 130, the memory management unit 110b checks to which logical block group the logical blocks belongs, and reads the corresponding logical block-physical block mapping table according to the corresponding sub-variable table, thereby the logical blocks of the access command is converted to the mapping physical blocks for performing access.

Figure 4:
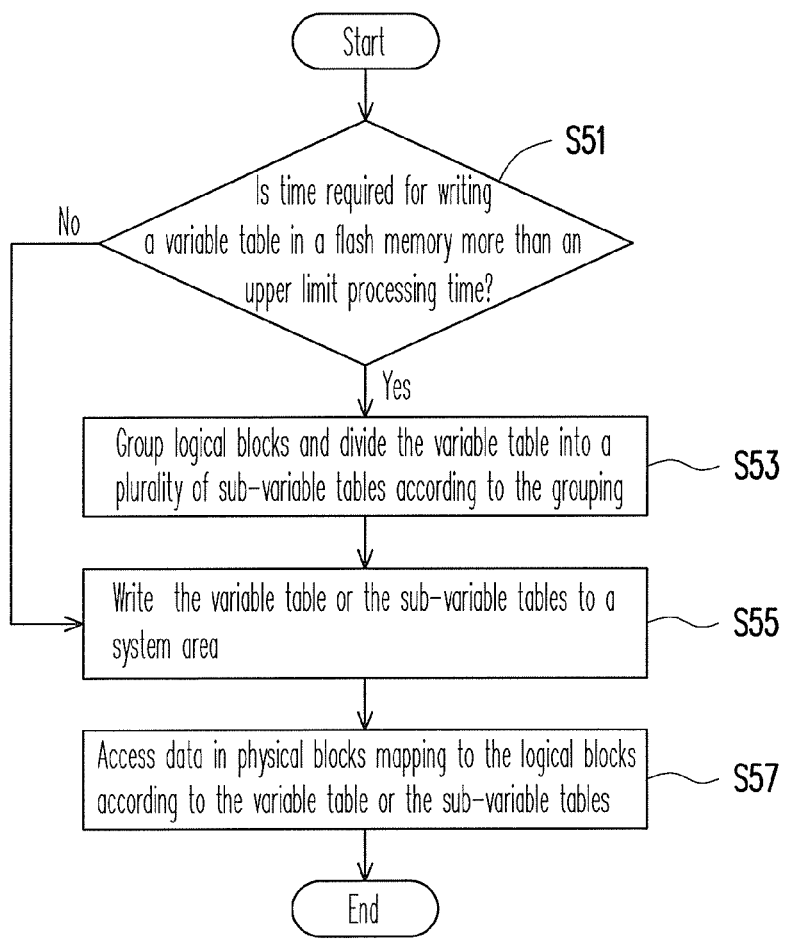
FIG. 4 is a flow chart illustrating a data access method according to an exemplary embodiment of the present invention.

FIG. 4 is a flow chart illustrating a data access method of an exemplary embodiment of the present invention.

Referring to FIG. 4, first, in step S51, the memory management unit 110b determines whether the time required for writing the variable table 214 into the flash memory 130 is more than the upper limit processing time, when the time required for writing the variable table 214 into the flash memory 130 is determined to be more than the upper limit processing time, in step S53 the memory management unit 110b groups the logical blocks 250-1~250-M, and divides the variable table 214 into a plurality of sub-variable tables according to the grouping. However, if in the step S51, the above-described required time would be less than or equal to the above-described upper limit processing time, in step S55 the memory management unit 110b writes current variable table (i.e., the variable table 214) into the system area 202. Similarly, after the step S53 is completed, in step S55 the memory management unit 110b writes all the current variable tables (e.g., the first sub-variable table 214a and the second sub-variable table 214b) into the system area 202. At last, in step S57, the data is accessed in the physical blocks mapping to the logical blocks according to the corresponding variable table.

In an exemplary embodiment of the present invention, when the memory management unit 110b executes the step S55 following the step S53, the memory management unit 110b stores entirely a plurality of sub-variable tables (e.g., the first sub-variable table 214a and the second sub-variable table 214b) in one page of different physical blocks in the system area 202, respectively, and size of each the sub-variable table does not exceed storage capacity of one page. For example, the first sub-variable table 214a is entirely stored in one page of the system area 202, and the second sub-variable table 214b is entirely stored in another page of the system area 202. Accordingly, if contents recorded in the first sub-variable table 214a are changed but contents recorded in the second sub-variable table 214b are not changed, the first sub-variable table 214a is just required to be updated and stored into another page. On the other hand, if the contents recorded in the second sub-variable table 214b are changed but the contents recorded in the first sub-variable table 214a are not changed, the second sub-variable table 214b is just required to be updated and stored into another page. Therefore, compared to the variable table becoming too large, resulting in time-consuming and inefficiency when a single variable table is updated in conventional art, the efficiency of updating the variable table in the present invention is better due to adaptively adopting a variable table or a plurality of sub-variable tables.

Moreover, in another embodiment of the present invention, two pages respectively storing the first sub-variable table 214a and the second sub-variable table 214b are be made to belong to two different physical blocks, and when the first sub-variable table 214a or the second sub-variable table 214b are updated, the first sub-variable table 214a or the second sub-variable table 214b whose contents are changed is stored to another page in the physical blocks. For example, assuming that the first sub-variable table 214a and the second sub-variable table 214b are respectively recorded in a first page of the physical block 130-0 and a first page of the physical block 130-1, then when the contents of the first sub-variable table 214a are changed but the contents of the second sub-variable table 214b are not changed, the second sub-variable table 214b is still stored in the first page of the above-described physical block 130-1, the updated first sub-variable table 214a is stored in a second page of the physical block 130-0 in the system area 202, and the memory management unit 110b marks data of the first page of the physical block 130-0 as invalid data which are no longer used.

It is to be noted that, steps illustrated in FIG. 4 is to determine whether the time required for writing the variable table in the flash memory 130 is more than the upper limit processing time during an operation period of the storage system 100, thereby the memory management unit 110b dynamically divides the variable table into a plurality of sub-variable tables. However, the present invention is not limited thereto, manufacturers of the storage system 100 may directly configure a plurality of the above-described sub-variable tables to the memory management unit 110b in the conversion layer according to hardware information of the storage system, such that the corresponding relationship of the logical blocks and the physical blocks is managed.

For example, the number of sets of the mother-child blocks of the data area 204 and the spare area 206 affects size of the variable table, thereby influencing the time required for writing the variable table into the system area 202. Therefore, in an exemplary embodiment in which the storage system 100 is designed to have the number of sets of opening mother-child blocks to be more than a first threshold, the conversion layer 290 configures a plurality of variable tables (e.g., the first sub-variable table 214a and the second sub-variable table 214b), and the memory management unit 110b maintains a plurality of variable tables configured so as to record the transient information of the mother-child blocks in the storage system 100. Here, the first threshold is set as 16 sets; however, the present invention is not limited thereto.

For example, the variable table records related information of each of the physical blocks in the spare area 206, such as the number of times for which each of the physical blocks in the spare area 206 has been erased and an address of each of the physical blocks in the spare area 206. Therefore, when the number of the physical blocks in the spare area 206 becomes more, information required to be recorded in the variable table also becomes more, such that the required time for writing the variable table into the system area 202 also becomes longer. Therefore, in an exemplary embodiment in which the spare area 206 of the storage system 100 is designed to have the number of the physical blocks more than a second threshold, the conversion layer 290 configures a plurality of variable tables (e.g., the first sub-variable table 214a and the second sub-variable table 214b), and the memory management unit 110b maintains a plurality of variable tables configured so as to record the transient information of the mother-child block in the storage system 100 and the information of the physical blocks of the spare area 206. Take a SSD with a storage capacity of 512 giga-bytes (GB), the spare area 206 is required to have approximately 4,096 of the physical blocks, so in the present exemplary embodiment, the above-described second threshold is set as 4,096; however, the present invention is not limited thereto.

In summary, the present invention utilizes a framework in which the number of the variable table is changeable, so as to access the physical blocks of the data area and the spare area in the flash memory. One variable table or a plurality of variable tables are utilized to manage the transient information of the mother-child blocks of the data area and the spare area in the flash memory, and the number of the above-described variable table is adaptively adjusted according to the required time for writing the above-described variable tables in the flash memory. To the storage system with massive storage capacity, the required time for updating the variable table would not exceed the upper limit processing time, such that the overall efficiency of the storage system is enhanced. Accordingly, the previously described exemplary embodiments of the present invention have many advantages, including the number of the variable table is adaptively adjusted and the overall efficiency of the storage system is enhanced, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data access method, comprising:
    providing a flash memory, wherein the flash memory comprises a plurality of physical blocks;
    configuring a plurality of logical blocks, wherein each of the logical blocks maps to at least one physical block;
    configuring a variable table to record transient information about mother-child blocks of the logical blocks;
    determining whether time required for writing the variable table into the flash memory is more than an upper limit processing time;
    at least grouping the logical blocks into a first logical block group and a second logical block group and at least dividing the variable table into a first sub-variable table and a second sub-variable table when the time required for writing the variable table into the flash memory is determined to be more than the upper limit processing time;
    accessing data in the physical blocks mapping to the logical blocks of the first logical block group according to the first sub-variable table; and
    accessing data in the physical blocks mapping to the logical blocks of the second logical block group according to the second sub-variable table.

2. The data access method as claimed in claim 1, wherein the step of determining whether the time required for writing the variable table into the flash memory is more than the upper limit processing time comprises:
    determining whether the number of sets of mother-child blocks of the flash memory is more than a first threshold, wherein when the number of sets of mother-child blocks of the flash memory is more than the first threshold, the required time is determined more than the upper limit processing time.

3. The data access method as claimed in claim 1, wherein the physical blocks are at least grouped into a system area, a data area and a spare area, wherein the step of determining whether the time required for writing the variable table into the flash memory is more than the upper limit processing time comprises:
    determining whether the number of the physical blocks of the spare area is more than a second threshold, wherein when the number of the physical blocks of the spare area is more than the second threshold, the required time is determined to be more than the upper limit processing time.

4. The data access method as claimed in claim 1, wherein the step of at least grouping the logical blocks into the first logical block group and the second logical block group comprises:
    at least grouping the logical blocks into the first logical block group and the second logical block group in a continuously sequential way, an odd-even way, or a random way.

5. The data access method as claimed in claim 1, wherein the first sub-variable table at least records the transient information about mother-child blocks for the logical blocks of the first logical block group, and the second sub-variable table at least records transient information about mother-child blocks for the logical blocks of the second logical block group.

6. The data access method as claimed in claim 1, wherein each of the physical blocks have a plurality of pages, and the first sub-variable table and the second sub-variable table are respectively and entirely stored in one page of different physical blocks among the physical blocks in a system area.

7. A controller is adapted to control a flash memory, wherein the flash memory has a plurality of physical blocks, the controller comprising:
    a microprocessor unit;
    a flash memory interface, coupled between the microprocessor unit and the flash memory; and
    a memory management unit, coupled to the microprocessor unit, for configuring a plurality of logical blocks, wherein each of the logical blocks maps to at least one physical block,
    wherein the memory management unit configures a variable table to record transient information about mother-child blocks of the logical blocks and determines whether time required for writing the variable table into the flash memory is more than an upper limit processing time,
    wherein the memory management unit at least groups the logical blocks into a first logical block group and a second logical block group and at least divides the variable table into a first sub-variable table and a second sub-variable table when the time required for writing the variable table into the flash memory is determined to be more than the upper limit processing time,
    wherein the memory management unit accesses the physical blocks mapping to the logical blocks of the first logical block group according to the first sub-variable table, and accesses the physical blocks mapping to the logical blocks of the second logical block group according to the second sub-variable table.

8. The controller as claimed in claim 7, wherein the memory management unit at least groups the logical blocks into the first logical block group and the second logical block group in a continuously sequential way, an odd-even way, or a random way.

9. The controller as claimed in claim 7, wherein the memory management unit further configures a plurality of logical block-physical block mapping tables.

10. The controller as claimed in claim 9, wherein the memory management unit further groups the logical block-physical block mapping tables to correspond to the first sub-variable table and the second sub-variable table according to the first logical block group and the second logical block group.

11. The controller as claimed in claim 7, wherein size of the first sub-variable table and size of the second sub-variable table are respectively less than size of one page of the flash memory.

12. The controller as claimed in claim 7, wherein the physical blocks are at least grouped into a system area, a data area and a spare area,
    wherein the memory management unit determines whether the number of the physical blocks of the spare area is more than a second threshold, wherein when the number of the physical blocks of the spare area is more than the second threshold, the required time is determined to be more than the upper limit processing time.

13. The controller as claimed in claim 7, wherein each of the physical blocks have a plurality of pages, and the first sub-variable table and the second sub-variable table are respectively and entirely stored in one page of different physical blocks among the physical blocks in a system area.

14. A storage system, comprising:
a connector;
a flash memory, comprising a plurality of physical blocks; and
a controller, coupled to the connector and the flash memory, for configuring a plurality of logical blocks, wherein each of the logical blocks maps to at least one physical block,
wherein the controller configures a variable table to record transient information about mother-child blocks of the logical blocks and determines whether time required for writing the variable table into the flash memory is more than an upper limit processing time,
wherein the controller at least groups the logical blocks into a first logical block group and a second logical block group and at least divides the variable table into a first sub-variable table and a second sub-variable table when the time required for writing the variable table into the flash memory is determined to be more than the upper limit processing time,
wherein the controller accesses the physical blocks mapping to the logical blocks of the first logical block group according to the first sub-variable table, and accesses the physical blocks mapping to the logical blocks of the second logical block group according to the second sub-variable table.

15. The storage system as claimed in claim 14, wherein the controller at least groups the logical blocks into the first logical block group and the second logical block group in a continuously sequential way, an odd-even way, or a random way.

16. The storage system as claimed in claim 14, wherein the controller further configures a plurality of logical block-physical block mapping tables.

17. The storage system as claimed in claim 16, further groups the logical block-physical block mapping tables to correspond to the first sub-variable table and the second sub-variable table according to the first logical block group and the second logical block group.

18. The storage system as claimed in claim 14, wherein size of the first sub-variable table and size of the second sub-variable table are respectively less than size of one page of the flash memory.

19. The controller as claimed in claim 7, wherein the memory management unit determines whether the number of sets of mother-child blocks of the flash memory is more than a first threshold, wherein when the number of sets of mother-child blocks of the flash memory is more than the first threshold, the required time is determined more than the upper limit processing time.

20. The storage system as claimed in claim 14, wherein the controller determines whether the number of sets of mother-child blocks of the flash memory is more than a first threshold, wherein when the number of sets of mother-child blocks of the flash memory is more than the first threshold, the required time is determined more than the upper limit processing time.

21. The storage system as claimed in claim 14, wherein the physical blocks are at least grouped into a system area, a data area and a spare area,
wherein the controller determines whether the number of the physical blocks of the spare area is more than a second threshold, wherein when the number of the physical blocks of the spare area is more than the second threshold, the required time is determined to be more than the upper limit processing time.

22. The storage system as claimed in claim 14, wherein each of the physical blocks have a plurality of pages, and the first sub-variable table and the second sub-variable table are respectively and entirely stored in one page of different physical blocks among the physical blocks in a system area.

* * * * *